Jan. 29, 1963    M. R. BUTLER, JR., ET AL    3,075,406
PROPELLER SHAFT DAMPER
Filed July 13, 1961
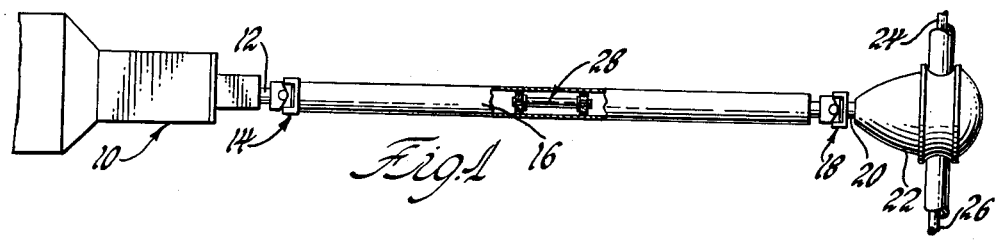
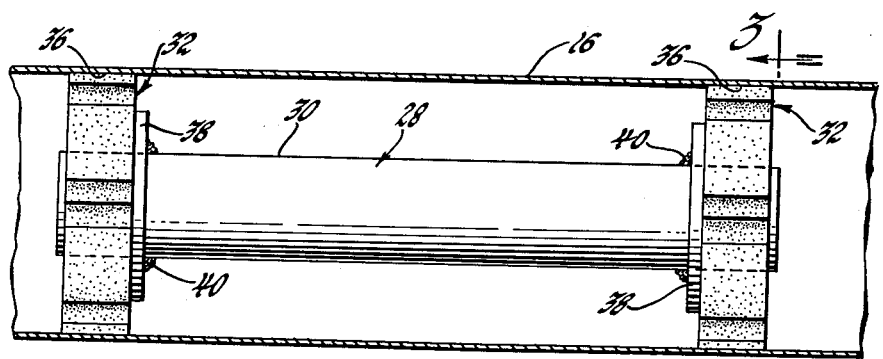
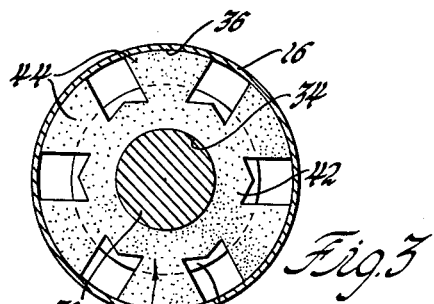
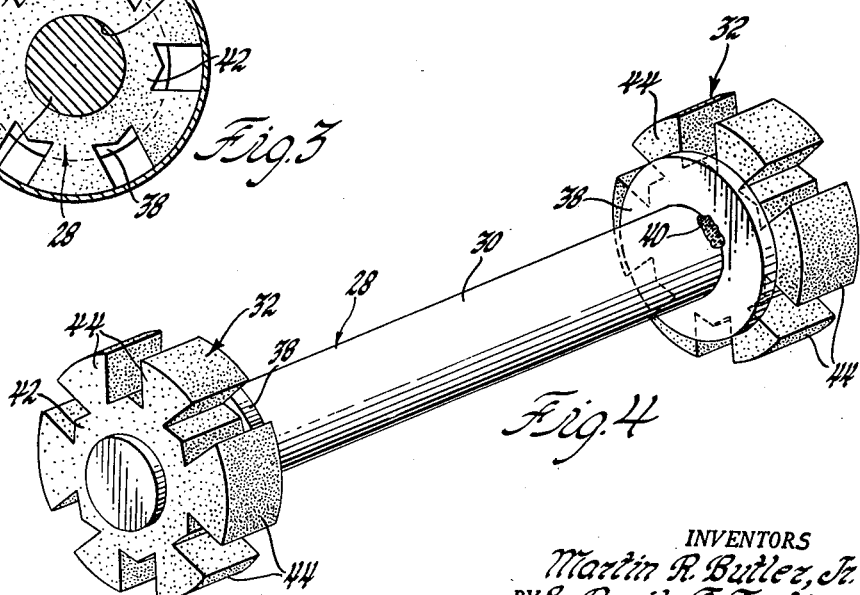
INVENTORS
Martin R. Butler, Jr.
BY & Basil F. Tucker
George A. Schmidt
ATTORNEY

United States Patent Office 3,075,406
Patented Jan. 29, 1963

3,075,406
PROPELLER SHAFT DAMPER
Martin R. Butler, Jr., and Basil F. Tucker, Pontiac, Mich., assignors to General Motors Corporation, Detroit, Mich., a corporation of Delaware
Filed July 13, 1961, Ser. No. 123,740
4 Claims. (Cl. 74—574)

This invention relates to vibration dampers, and more particularly to a vibration damper for use in a tubular propeller shaft.

In the design and manufacture of motor vehicles, propeller shafts are used to transmit the driving torque from the engine and/or transmission to the rear axle. These propeller shafts are subject to a number of vibrations from various sources and it is desirable to damp out or eliminate such vibrations wherever possible. Some of the vibrations are excited at rotational speeds above or below the normal operating speed of the engine, and these are not objectionable. However, depending on the size and type of the engine used, vibrations that are not objectionable for one engine may become objectionable for another. For example, a propeller shaft used with a typical V-8 engine may have a bending resonant frequency of vibration that is not excited within the normal operating range of the engine. With a V-6 engine on the other hand, the critical frequency of vibration of the same propeller shaft might fall within the operating range of the engine.

The device in which this invention is embodied comprises, generally, a rigid mass that may be located within the propeller shaft and is supported therein by resilient mounting members. The device damps or absorbs vibration while rotating at speeds within the normal operating range of the engine. Being inside the propeller shaft, the device is held from entering an off center condition, preventing the possibility of a primary unbalance in the propeller shaft. At the same time, the device is protected by the propeller shaft from the weather.

The resulting structure is a relatively inexpensive and simply assembled means to damp or absorb objectionable propeller shaft vibrations.

These and other advantages will become more apparent from the following description and drawing in which:

FIGURE 1 is a view of a portion of a motor vehicle showing a propeller shaft extending between the transmission and differential and illustrating the use of a vibration damper;

FIGURE 2 is an enlarged view of a portion of the structure shown in FIGURE 1, illustrating the vibration damper embodying this invention;

FIGURE 3 is an end view of a vibration damper shown in FIGURE 2, taken substantially along the line 3—3 of FIGURE 2 and looking in the direction of the arrows; and FIGURE 4 is an isometric view of the vibration damper illustrated in FIGURES 2 and 3.

Referring more particularly to the drawing, FIGURE 1 best illustrates the construction of a typical motor vehicle and the use of the vibration damper. The vehicle transmission, illustrated generally by the numeral 10, is driven in any suitable manner, as by the usual internal combustion engine. The transmission output shaft 12 is connected to a universal joint 14 in the usual manner. A tubular propeller shaft 16 extends rearwardly from universal joint 14 to a second universal joint 18, which in turn is connected to the input shaft 20 of a standard differential unit 22. Differential unit 22 divides the power to the axle shafts 24 and 26 in the usual fashion. Propeller shaft 16 is shown to be of one-piece construction, although this is not necessary to the invention.

Located within the tubular propeller shaft 16 is a vibration damper, illustrated generally by the numeral 28. The purpose of the vibration damper 28 is to damp or absorb vibrations excited in the propeller shaft 16 by the engine, or by the rotation of the universal joints 14 and 18, which vibrations are excited by speeds within the normal operating range of the engine.

FIGURES 2 and 3 best illustrate the vibration damper 28 shown in FIGURE 1. A rigid mass 30, which may take the form of a cylindrical metal bar, is to be located within the tubular propeller shaft 16. Mass 30 is separated from the walls of the tubular propeller shaft 16 by a pair of annular resilient members 32. Members 32 are secured to the mass 30 at opposite ends thereof, as by bonding at 34. Members 32 have an outer diameter which is substantially the same as the internal diameter of the tubular shaft 16 and are secured at their outer periphery to the propeller shaft 16, as by bonding at 36. Annular washer members 38 may be provided to properly support the resilient members 32 on the mass 30, and are welded or otherwise secured to the mass 30 as at 40.

The particular configuration of the resilient members 32 and the size of the mass 30 are such that the natural frequency of vibration of the assembly coincides with the resonant vibration frequency of the propeller shaft. At this frequency the vibration damper achieves its maximum damping, since the motion of the mass is out of phase with the radial motion of the tubular propeller shaft. Since the resilient members 32 are bonded to both the mass 30 and the propeller shaft 16, the device is self-centering. When the mass 30 tends to move in a lateral direction, parts of the resilient members are placed in compression between the mass 30 and the propeller shaft 16, and the opposite portions of the resilient members are placed in tension. Thus, the tendency is to return the mass 30 to its central position.

Referring to FIGURE 3, resilient members 32 are shown to include a central portion 42 surrounding the mass 30. A plurality of arms 44 extend from the central portion 42 to the wall of the propeller shaft tube 16. The particular configuration and stiffness of the resilient member is such, as above pointed out, as to provide the proper natural frequency of vibration along with the mass 30.

Thus, a vibration damper is provided which may be used inside a tubular propeller shaft to provide the optimum vibration absorption within the operating range of the engine. The device is protected from the elements and is relatively inexpensive and uncomplicated to manufacture and assemble.

What is claimed is:

1. A vibration damper for a rotating tubular propeller shaft comprising:
    a rigid mass adapted to be disposed within said propeller shaft;
    and a resilient mount bonded to said mass and adapted to be bonded to said propeller shaft and support said mass in said propeller shaft;
    said mass and said mount having a natural frequency of vibration the same as the natural frequency of vibration of said propeller shaft.

2. A vibration damper for a rotating tubular propeller shaft comprising:
    a rigid elongated mass adapted to be located within said propeller shaft;
    and an annular resilient member bonded to each end of said mass and adapted to be bonded to said propeller shaft and support said mass within said propeller shaft;
    said mass and said resilient members having as a unit a natural frequency of vibration coinciding with the natural frequency of vibration of said propeller shaft.

3. A vibration damper for a rotating tubular shaft comprising:
    a rigid elongated cylindrical member adapted to be disposed within said rotating shaft;

and a pair of annular resilient members bonded to said cylindrical member and adapted to be bonded to said tubular shaft;

said vibration damper having a natural frequency of vibration the same as the natural frequency of vibration of said rotating shaft.

4. A vibration damper for a rotating tubular shaft comprising:

a rigid elongated member adapted to be disposed within said rotating tubular shaft;

and a pair of annular resilient members bonded to said elongated member, one of said pair of resilient members being at each end of said elongated member, said resilient members being adapted to be secured to said tubular shaft;

said elongated member and said resilient members as a unit having a natural frequency of vibration the same as the natural frequency of vibration of said rotating tubular shaft.

References Cited in the file of this patent

UNITED STATES PATENTS

| | | |
|---|---|---|
| 1,867,708 | Paton | July 19, 1932 |
| 2,878,689 | Aebersold | Mar. 24, 1959 |